United States Patent
Mihoichi et al.

(10) Patent No.: US 12,503,069 B2
(45) Date of Patent: Dec. 23, 2025

(54) DEVICE FOR SHORTENING STARTUP TIME OF AUTONOMOUS VEHICLE SENSORS

(71) Applicant: KABUSHIKI KAISHA TOYOTA JIDOSHOKKI, Kariya (JP)

(72) Inventors: Takuto Mihoichi, Kariya (JP); Yuichi Nishino, Kariya (JP); Masataka Ishizaki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 171 days.

(21) Appl. No.: 18/279,722

(22) PCT Filed: Feb. 24, 2022

(86) PCT No.: PCT/JP2022/007711
§ 371 (c)(1),
(2) Date: Aug. 31, 2023

(87) PCT Pub. No.: WO2022/190892
PCT Pub. Date: Sep. 15, 2022

(65) Prior Publication Data
US 2024/0308451 A1    Sep. 19, 2024

(30) Foreign Application Priority Data
Mar. 10, 2021  (JP) .................. 2021-038454

(51) Int. Cl.
*B60R 16/03*   (2006.01)
*B60W 40/02*   (2006.01)
(Continued)

(52) U.S. Cl.
CPC ............ *B60R 16/03* (2013.01); *B60W 40/02* (2013.01); *B60W 60/0023* (2020.02); *G06V 20/58* (2022.01); *B60W 2420/40* (2013.01)

(58) Field of Classification Search
None
See application file for complete search history.

(56) References Cited

U.S. PATENT DOCUMENTS

| | | | |
|---|---|---|---|
| 2018/0072229 A1 | 3/2018 | Mano et al. | |
| 2018/0262724 A1* | 9/2018 | Ross | ...................... G06V 20/40 |
| 2018/0265020 A1* | 9/2018 | Aoyagi | ................... B60R 25/24 |

FOREIGN PATENT DOCUMENTS

| | | |
|---|---|---|
| JP | 2006-260105 A | 9/2006 |
| JP | 2011-23921 A | 2/2011 |

(Continued)

OTHER PUBLICATIONS

English translation of JP 2020160583 A (Published Oct. 1, 2020) (Retrieved from PE2E Search May 1, 2025) (Year: 2025).*

(Continued)

*Primary Examiner* — James J Lee
*Assistant Examiner* — Jonathan E Reinert
(74) *Attorney, Agent, or Firm* — Sughrue Mion, PLLC (57) ABSTRACT

A perception device includes a perception unit configured to perceive surroundings of a moving body based on a detection result of a detection unit, an obtaining unit configured to obtain supply information and instruction information indicating an instruction for an operation to the moving body, and an operation control unit configured to control a state of the perception device. The perception device is in a perception state in which the perception device perceives the surroundings, in a stop state or in a standby state. When the instruction information obtained in the perception state indicates the instruction for stopping the operation of the moving body, the operation control unit keeps the state of the perception device in the perception state without transitioning to the stop state or causes the state of the perception device to transition to the standby state.

6 Claims, 2 Drawing Sheets

(51) Int. Cl.
  *B60W 60/00* (2020.01)
  *G06V 20/58* (2022.01)

(56) References Cited

FOREIGN PATENT DOCUMENTS

| | | |
|---|---|---|
| JP | 2011-143925 A | 7/2011 |
| JP | 2011-239213 A | 11/2011 |
| JP | 2016-120845 A | 7/2016 |
| JP | 2020-160583 A | 10/2020 |
| KR | 10-2018-0120463 A | 11/2018 |

OTHER PUBLICATIONS

International Search Report for PCT/JP2022/007711 dated Apr. 12, 2022.
Extended European Search Report issued Jul. 15, 2024 in European Application No. 22766851.4.
Korean Office Action dated Jul. 31, 2025, issued in Korean application No. 10-2023-7029904.

* cited by examiner

DEVICE FOR SHORTENING STARTUP TIME OF AUTONOMOUS VEHICLE SENSORS

CROSS-REFERENCE TO RELATED APPLICATIONS

This Application is a National Stage of International Application No. PCT/JP2022/007711 filed Feb. 24, 2022, claiming priority based on Japanese Patent Application No. 2021-038454 filed Mar. 10, 2021, the contents of all of which are incorporate herein by reference in their entirety.

TECHNICAL FIELD

The present disclosure relates to a perception device.

BACKGROUND ART

In a moving body that travels autonomously, there is described a technique for perceiving surroundings of the moving body (For example, see Patent Document 1).

CITATION LIST

Patent Document

Patent Document 1: Japanese Patent Application Publication No. 2006-260105

SUMMARY OF INVENTION

Technical Problem

Here, a perception device that is mounted on the moving body and perceives the surroundings of the moving body may take a long time on startup. In addition, a passenger of the moving body may try to suppress energy consumption of the moving body by stopping the moving body when the moving body is not temporarily used. Accordingly, when the passenger of the moving body starts up the moving body after temporarily stopping the moving body in order to suppress energy consumption of the moving body, the perception device may fail to start up immediately.

Solution to Problem

A perception device to solve the above-described problem includes a perception unit configured to perceive surroundings of a moving body based on a detection result of a detection unit, an obtaining unit configured to obtain supply information indicating a supply state of an electric power from a power supply mounted on the moving body to the moving body and instruction information indicating an instruction for an operation to the moving body, and an operation control unit configured to control a state of the perception device based on the supply information and the instruction information. The perception device is in a perception state in which the perception device perceives the surroundings, in a stop state in which the perception device stops a process of perceiving the surroundings, or in a standby state in which the perception device stands by until the state of the perception device is transitioned to the perception state. When the instruction information obtained in the perception state indicates the instruction for stopping the operation of the moving body, the operation control unit keeps the state of the perception device in the perception state without transitioning to the stop state or causes the state of the perception device to transition to the standby state.

With this configuration, when the moving body is started up after the passenger of the moving body temporarily stops the moving body, a startup time of the perception device is shortened due to the perception device.

According to the above-described perception device the obtaining unit may obtain information indicating an on-state or an off-state of a switch provided in a key cylinder of the moving body as the instruction information.

With this configuration, due to the perception device, the passenger of the moving body can easily instruct the moving body on the operation.

According to the above-described perception device, after the operation control unit keeps the state of the perception device in the perception state or causes the state of the perception device to transition to the standby state, when a specified condition is satisfied, the operation control unit may cause the state of the perception device to transition to the stop state.

With this configuration, when the specified condition is satisfied, it is possible that the operation control unit suppresses energy consumption of the moving body.

According to the above-described perception device, the specified condition may include a condition that a specified time has passed since the transitioning to the standby state.

With this configuration, when the specified time has passed since the transition to the standby state, the operation control unit causes the state of the perception device to transition to the stop state, so that it is possible to suppress energy consumption of the moving body associated with the continuation of the standby state.

According to the above-described perception device, the obtaining unit further obtains detection information indicating the detection result of the detection unit, the specified condition includes a condition that the detection result shows that there is no person around the moving body, after the operation control unit causes the state of the perception device to transition to the standby state, the perception unit perceives the surroundings based on the detection result of the detection unit, and when the perception result shows that there is no person around the moving body, the operation control unit causes the state of the perception device to transition to the stop state.

With this configuration, when the detection result shows that there is no person around the moving body, it is possible that the operation control unit causes the state of the perception device to transition to the stop state to suppress energy consumption of the moving body associated with the continuation of the standby state.

According to the above-described perception device, in a case where the instruction information indicates the instruction for stopping the operation of the moving body when the operation control unit causes the state of the perception device to transition from the standby state to the perception state, the operation control unit may cause the state of the perception device to transition from the perception state to the standby state.

With this configuration, after the state of the perception device is transitioned from the standby state to the perception state, in a case where the operation of the moving body is stopped again while the perception device starts up in a shortened startup time, the operation control unit causes the state of the perception device to transition to the standby state, so that it is possible to suppress energy consumption of the moving body associated with the continuation of the perception state.

Advantageous Effect of Invention

According to the present disclosure, the perception device shortens a start-up time when the moving body is started up after temporarily stopped.

DESCRIPTION OF EMBODIMENTS

Embodiment

The following will describe an embodiment of a perception device according to the present disclosure with reference to the drawings.

[Overview]

Figure 1:
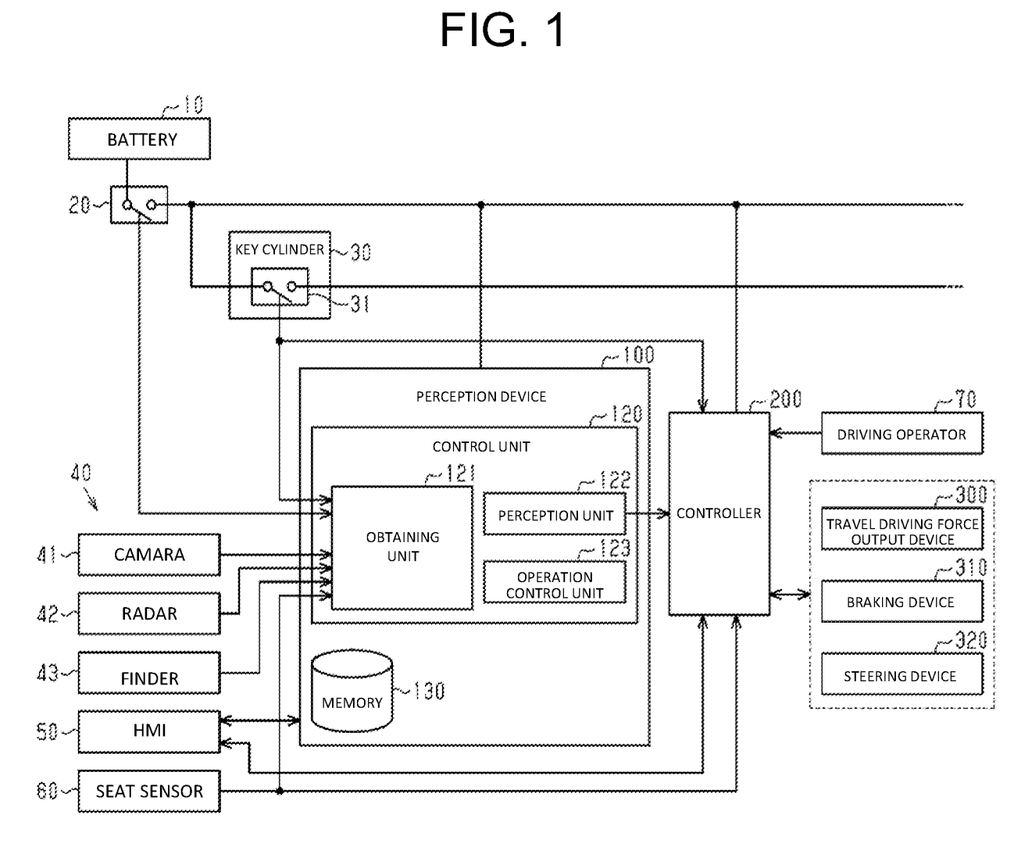
FIG. 1 is a view illustrating an example of a configuration of a vehicle system having a perception device according to an embodiment.

One example of an industrial vehicle on which a vehicle system illustrated in FIG. 1 is mounted is a vehicle such as a two-wheeler, a three-wheeler, or a four-wheeler, and a driving source of such a vehicle is an internal combustion engine such as a diesel engine or a gasoline engine, an electric motor, or a combination thereof. The following will describe a case where the industrial vehicle has an internal combustion engine as the driving source. The industrial vehicle corresponds to one example of a moving body.

A vehicle system includes a battery 10, a switch 20, a key cylinder 30, detection units 40, an HMI (Human Machine Interface) 50, a seat sensor 60, a driving operator 70, a perception device 100, a controller 200, a travel driving force output device 300, a braking device 310, and a steering device 320, for example. These devices and pieces of equipment are connected with each other via multiplex communication lines such as CAN (Controller Area Network) communication lines, a serial communication line, a wireless communication network, and the like.

For example, a secondary storage battery is used as the battery 10 and the battery 10 is charged to store electric power generated by an electric generator connected to the internal combustion engine. The electric power stored in the battery 10 is used for startup and operations of various elements in the vehicle system. The battery 10 is one example of a power supply mounted on the moving body.

The switch 20 switches electric connection, for example, between the battery 10 and the various elements in the industrial vehicle. For example, when an operation of the industrial vehicle is completely stopped, the passenger of the industrial vehicle sets the switch 20 in an off-state to electrically disconnect the battery 10 from the industrial vehicle, thereby not allowing the battery 10 to supply the electric power to the industrial vehicle. In addition, when the operation of the industrial vehicle is started up, the passenger of the industrial vehicle sets the switch 20 in an on-state to electrically connect the battery 10 to the industrial vehicle, thereby causing the battery 10 to supply the power to the industrial vehicle. In the subsequent description, information indicating the on-state or the off-state of the switch 20 is also referred to as supply information. Here, the on-state or the off-state of the switch 20 correspond to a supply state of the electric power from the battery 10 to the industrial vehicle. Accordingly, supply information indicating that the switch 20 is in the on-state is one example of the supply information indicating that the electric power is supplied from the battery 10 to the industrial vehicle. Further, supply information indicating that the switch 20 is in the off-state is one example of the supply information indicating that the electric power is not supplied from the battery 10 to the industrial vehicle.

A mechanical key of the industrial vehicle is inserted into the key cylinder 30. A switch 31 is provided in the key cylinder 30. When the mechanical key inserted in the key cylinder 30 is rotated, the switch 31 switches the electric connection between the battery 10 and at least a part of the various elements in the industrial vehicle. For example, the passenger of the industrial vehicle rotates the mechanical key inserted in the key cylinder 30 to an off-position when the operation of the industrial vehicle is stopped. On the other hand, the passenger of the industrial vehicle rotates the mechanical key inserted in the key cylinder 30 to an on-position when the operation of the industrial vehicle is started up.

In the subsequent description, it is also referred to as the key cylinder 30 being in an on-state that the switch 31 provided in the key cylinder 30 is in the on-state. It is also referred to as the key cylinder 30 being in an off-state that the switch 31 provided in the key cylinder 30 is in the off-state. In addition, information indicating the on-state or the off-state of the key cylinder 30 is also referred to as instruction information in the subsequent description. Here, setting the key cylinder 30 in the on-state by the passenger of the industrial vehicle instructs the industrial vehicle to start the operation. On the other hand, setting the key cylinder 30 in the off-state by the passenger of the industrial vehicle instructs the industrial vehicle to stop the operation. Accordingly, the instruction information indicating that the key cylinder 30 is in the on-state is one example of instruction information indicating an instruction for starting the operation of the industrial vehicle. The instruction information indicating that the key cylinder 30 is in the off-state is one example of instruction information indicating an instruction for stopping the operation of the industrial vehicle.

In the present embodiment, when the key cylinder 30 is set in the off-state, operations of the internal combustion engine and the electric motor of the industrial vehicle are stopped. Accordingly, when the key cylinder 30 is set in the off-state, a part of the various elements in the industrial vehicle that is not stopped by setting the key cylinder 30 in the off-state is operated by the electric power stored in the battery 10.

The detection units 40 detect an object, and the like around the industrial vehicle. The detection units 40 include, for example, a camera 41, a radar 42, and a finder 43.

The camera 41 is installed at any position at which the camera 41 is capable of capturing the surroundings of the industrial vehicle. The camera 41 corresponds to a digital camera including an imaging device such as a CCD (Charge Coupled Device) and a CMOS (Complementary Metal Oxide Semiconductor), and captures the surroundings of the industrial vehicle in specified period. The camera 41 captures the surroundings of the industrial vehicle, and outputs image data showing a generated image to the perception device 100. The image data is one example of detection information.

The radar 42 radiates electric waves such as millimeter waves around the industrial vehicle and detects reflected waves reflected from an object present around the industrial vehicle, so that the radar 42 detects at least a position of the object, a distance to the object, and a direction thereto. The radar 42 is attached at any point on the industrial vehicle. The radar 42 may detect a position and a velocity of the object by using an FM-CW (Frequency Modulated Continuous Wave) method. The radar 42 outputs radar information indicating the detection result to the perception device 100. The radar information is one example of the detection information.

The finder 43 is a sensor unit using a LIDAR (Light Detection and Ranging). The finder 43 radiates light around the industrial vehicle and measures scattered light. The finder 43 detects a distance to the object based on a time from light emission until light reception. The radiated light is, for example, pulsed laser light. The finder 43 is attached at any point on the industrial vehicle. The finder 43 outputs finder information indicating the detection result to the perception device 100. The finder information is one example of the detection information.

The HMI 50 presents various types of information to the passenger of the industrial vehicle, and receives an input by the passenger. The HMI 50 includes various types of displays, speakers, buzzers, touch panels, switches, and the like.

The seat sensor 60 detects whether or not the passenger has got in the industrial vehicle and seated on a seat thereof. The seat sensor 60 outputs seating information indicating a detection result to the controller 200. The seat sensor 60 is provided in the seat of the industrial vehicle. The seat having the seat sensor 60 is, for example, a driver's seat.

The driving operator 70 includes, for example, an accelerator pedal, a brake pedal, a shift lever, a steering wheel, an odd-shaped steering wheel, a joystick, and other operators. A sensor is attached to the driving operator 70 and detects an amount of operation or whether the operation is performed. The detection result of the driving operator 70 is output to the controller 200, or a part or all of the travel driving force output device 300, the braking device 310, and the steering device 320.

The perception device 100 performs a sensor fusion process on the detected results obtained by a part or all of the camera 41, the radar 42, and the finder 43, so that the perception device 100 perceives the object to obtain a position, a type, and a velocity thereof. The perception device 100 outputs the perception result to the controller 200.

The controller 200 notifies the passenger of the industrial vehicle of the presence of the object around the industrial vehicle based on the perception result obtained from the perception device 100. For example, when the perception result of the perception device 100 indicates that the object is present around the industrial vehicle, the controller 200 outputs a notification sound or a voice sound of a notification message from a speaker of the HMI 50. The notification message may include a detailed position and type of the object indicated in the perception result. In detail, the notification message may be a massage, for example, "There is a person in front on your left. Please take care and drive safely.". In addition, when the HMI 50 includes a plurality of speakers that are each installed on all sides in a vehicle interior, the controller 200 may output a notification sound from one or more speakers, which are located at a position corresponding to a position of the object present around the industrial vehicle.

The controller 200 controls the travel driving force output device 300, the braking device 310, and the steering device 320 based on the information input from the driving operator 70.

The travel driving force output device 300 outputs a travel driving force for the traveling of the industrial vehicle to driving wheels. The travel driving force output device 300 includes, for example, a combination of an internal combustion engine, an electric motor, a transmission, and the like and an ECU (Electronic Control Unit) that controls these elements. The ECU controls the above-described configuration in accordance with the information input from the controller 200 or the driving operator 70.

The braking device 310 includes, for example, a brake caliper, a cylinder that transmits hydraulic pressure to the brake caliper, an electric motor that generates the hydraulic pressure in the cylinder, and a brake ECU. The brake ECU controls the electric motor according to the information input from the controller 200 or the driving operator 70 so that a brake torque corresponding to a braking operation is output to the respective wheels. The braking device 310 may include a mechanism that transmits hydraulic pressure generated by operating the brake pedal in the driving operator 70, to the cylinder through a master cylinder as a backup. The braking device 310 is not limited to the above-described configuration, and may be an electronically controlled hydraulic braking device that controls an actuator according to the information input from the controller 200, which transmits the hydraulic pressure of the master cylinder to the cylinder.

The steering device 320 includes, for example, a steering ECU and an electric motor. For example, the electric motor applies a force to a rack and pinion mechanism to change a direction of steered wheels. The steering ECU drives the electric motor according to the information input from the controller 200 or the information input from the driving operator 70 to change the direction of the steered wheels.

[Connection of Battery 10]

As described above, the switch 20 switches the electrical connection between the battery 10 and the various elements in the industrial vehicle, and the key cylinder 30 switches the electrical connection between the battery 10 and at least a part of the various elements in the industrial vehicle. In the present embodiment, the battery 10 is connected to the perception device 100 via the switch 20. The key cylinder 30 is not connected between the perception device 100 and the battery 10. Accordingly, when the switch 20 is set in the on-state, electric power is supplied to the perception device 100 from the battery 10 regardless of the state of the key cylinder 30.

[Perception Device 100]

The following will describe a detail of the perception device 100. The perception device 100 includes, for example, a control unit 120 and a memory 130. The control unit 120 is, for example, a hardware processor such as a CPU (Central Processing Unit) that executes programs (software). A part or all of these elements may be formed of a hardware (a circuit unit: including circuitry) such as an LSI (Large Scale Integration), an ASIC (Application Specific Integrated Circuit), an FPGA (Field-Programmable Gate Array), or a GPU (Graphics Processing Unit), or a combination of the software and the hardware.

The memory 130 is formed of, for example, a memory (a memory including non-transitory storage medium) such as an HDD (Hard Disk Drive) or a flash memory, or a detachable memory such as a DVD or a CD-ROM. The programs serving as the control unit 120 are stored in the memory 130.

The control unit 120 includes, for example, an obtaining unit 121, a perception unit 122, and an operation control unit 123. The obtaining unit 121 obtains the supply information from the switch 20 and the instruction information from the key cylinder 30. The obtaining unit 121 also obtains the seating information from the seat sensor 60. The obtaining unit 121 also obtains the information indicating the detection results from the detection units 40. Specifically, the obtaining unit 121 obtains the image data from the camera 41, the radar information from the radar 42, and the finder information from the finder 43.

The perception unit 122 perceives surroundings of the industrial vehicle based on the information indicating detection results of the detection units 40 obtained by the obtaining unit 121. More specifically, the perception unit 122 performs the sensor fusion process on the detection results from a part or all of the camera 41, the radar 42, and the finder 43, so that the perception unit 122 perceives the object to obtain a position, a type, a velocity, and the like of an object present around the industrial vehicle.

The operation control unit 123 controls a state of the perception device 100 based on the information obtained by the obtaining unit 121. The operation control unit 123 causes a state of the perception device 100 to transition to any one of a perception state, a stop state, and a standby state, for example. The perception state is a state in which the perception device 100 perceives the surroundings of the industrial vehicle. The stop state is a state in which the perception device 100 stops a process of perceiving the surroundings of the industrial vehicles. The standby state is a state in which the perception device 100 stands by until the state of the perception device 100 is transitioned to the perception state.

Here, it may take a long time that the state of the perception device 100 is transitioned from the stop state to the perception state after controlled to be set in the stop state. A time required for the transitioning from the standby state to the perception state is shorter than that required for the transitioning from the stop state to the perception state. In the stop state, for example, the power of the perception device 100 is turned off. The standby state is, for example, a power saving state in which an amount of electric power consumed by the perception device 100 is smaller than that in the perception state. In the subsequent description, it is assumed that the perception device 100 does not perform a process of perceiving the surroundings of the industrial vehicle in the standby state.

[Operating Flow]

Figure 2:
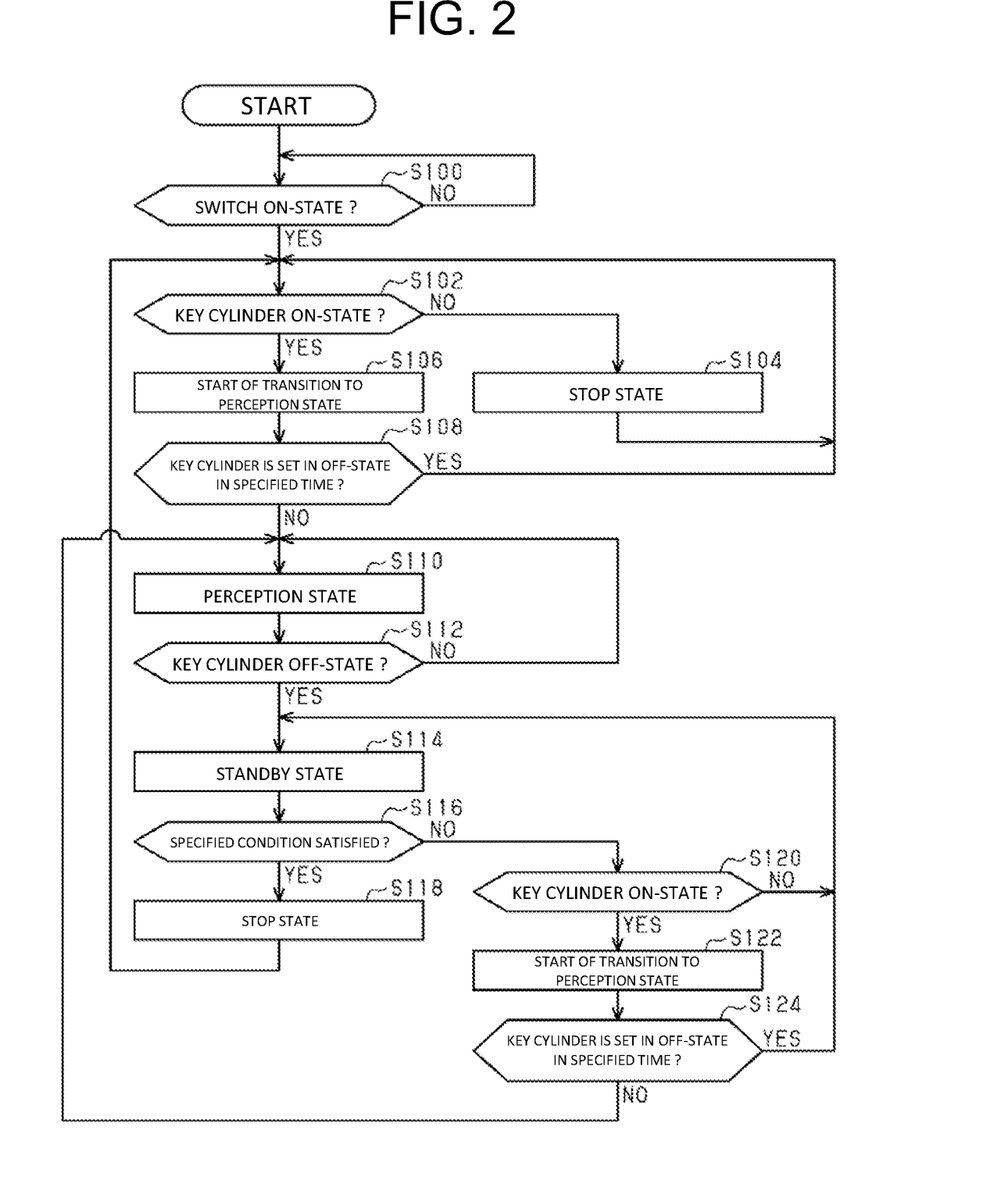
FIG. 2 is a flowchart showing an example of an operation of the perception device.

The following will describe a detail of a process in which the operation control unit 123 causes the state of the perception device 100 to transition, referring to FIG. 2. In the start of a flowchart in FIG. 2, the switch 20 is in the off-state. Firstly, the vehicle system stops until the switch 20 is set in the on-state (Step S100). When the switch 20 is controlled to be set in the on-state and the operation of the vehicle system is started, the operation control unit 123 determines whether or not the key cylinder 30 is in the on-state based on the instruction information obtained by the obtaining unit 121 (Step S102). When the instruction information indicates that the key cylinder 30 is in the off-state, the operation control unit 123 causes the state of the perception device 100 to transition to the stop state, and then, proceeds to Step S102 (Step S104).

The operation control unit 123 starts the transition from the stop state to the perception state when the instruction information indicates that the key cylinder 30 is in the on-state (Step S106). As described above, it may take a long time that the state of the perception device 100 is transitioned from the stop state to the perception state. The operation control unit 123 determines whether or not the key cylinder 30 is controlled to be set in the off-state in a specified time required for the transitioning from the stop state to the perception state, based on the instruction information obtained by the obtaining unit 121 (Step S108). When the operation control unit 123 determines that the key cylinder 30 is controlled to be set in the off-state in the specified time required for the transitioning from the stop state to the perception state, the operation control unit 123 stops the process of the transitioning from the stop state to the perception state, and proceeds to Step S102.

When the operation control unit 123 determines that the key cylinder 30 is not controlled to be set in the off-state within the specified time required for the transitioning from the stop state to the perception state, the operation control unit 123 does not stop the process of the transitioning but causes the state of the perception device 100 to transition to the perception state (Step S110). When the perception device 100 is in the perception state, the perception unit 122 perceives the surroundings of the industrial vehicle based on the information indicating the detection results of detection units 40 obtained by the obtaining unit 121. Further, a notification lamp, which is not illustrated, is provided on the industrial vehicle. When the state of the perception device 100 is set in the perception state, the controller 200 may supply electric power to the notification lamp and emit light to the passenger. In this way, the notification lamp notifies an operator that the state of the perception device 100 is set in the perception state. When the industrial vehicle is a forklift, the notification lamp is preferably provided on a pillar of a headguard in view of visibility of the passenger. However, the notification lamp may be provided on a housing of the camera 41 or various display devices of the HMI 50.

When the perception device 100 is in the perception state, the operation control unit 123 determines whether or not the key cylinder 30 is in the off-state based on the instruction information obtained by the obtaining unit 121 (Step S112). The operation control unit 123 proceeds to Step S110, and keeps the state of the perception device 100 in the perception state until the key cylinder 30 is determined to be in the off-state when the perception device 100 is in the perception state. When the operation control unit 123 determines that the key cylinder 30 is in the off-state based on the instruction information obtained by the obtaining unit 121, the operation control unit 123 causes the state of the perception device 100 to transition to the standby state (Step S114). The controller 200 may shut off the power to the notification lamp and turn off the notification lamp when the state of the perception device 100 is set in the standby state.

After the operation control unit 123 causes the state of the perception device 100 to transition to the standby state, the operation control unit 123 determines whether or not a specified condition is satisfied (Step S116). The specified condition includes, for example, two conditions of a first condition and a second condition.

The first condition is that the specified time has passed since the transitioning to the standby state. For example, the specified time may be changed in correspondence with a remaining electric power of the battery 10, may be determined in advance based on an electrical power consumed when the perception device 100 operates in the standby state, or may be determined based on a value input to the HMI 50 by the passenger of the industrial vehicle. For example, the operation control unit 123 determines, at all times or at each time interval shorter than the specified time, whether the time that has passed since the state of the perception device 100 is transitioned to the standby state in Step S114 is equal to or longer than the specified time.

The second condition is that the detection results of the detection units 40 show that there is no person around the industrial vehicle. For example, after the operation control unit 123 causes the state of the perception device 100 to transition to the standby state in Step S114, the obtaining unit 121 obtains detection information from the detection units 40 at all times or at each time interval shorter than the specified time. Every time the obtaining unit 121 obtains detection information, the operation control unit 123 causes the perception unit 122 to temporarily perceive the surroundings of the industrial vehicle based on the obtained detection information. The operation control unit 123 determines whether or not the perception result by the perception unit 122 shows that there is no person around the industrial vehicle.

When the operation control unit 123 determines that the specified condition is satisfied after causing the state of the perception device 100 to transition to the standby state, the operation control unit 123 causes the state of the perception device 100 to transition to the stop state, and proceeds to Step S102 (Step S118). In the present embodiment, when the operation control unit 123 determines that the first condition or the second condition is satisfied, it is considered that the specified condition is satisfied, so that the operation control unit 123 proceeds to Step S118.

Specifically, when the operation control unit 123 determines that the time that has passed since causing the state of the perception device 100 to transition to the standby state in Step S114 is equal to or longer than the specified time, the specified condition is determined to be satisfied. When the operation control unit 123 determines that the obtained seating information indicates that there is no passenger in the industrial vehicle, the specified condition is also determined to be satisfied. In addition, when the operation control unit 123 determines that the perception result of the perception unit 122 shows that the there is no person around the industrial vehicle, the specified condition is also determined to be satisfied.

When the operation control unit 123 determines that the specified condition is not satisfied, the operation control unit 123 determines whether the key cylinder 30 is set in the on-state (Step S120). The operation control unit 123 processes to Step S114 until the operation control unit 123 determines that the key cylinder 30 is set in the on-state, and keeps the state of the perception device 100 in the standby state. When the operation control unit 123 determines that the key cylinder 30 is set in the on-state, the operation control unit 123 starts the transition from the standby state to the perception state (Step S122). A time required from the start of the transitioning from the standby state to the perception state in Step S122 to the completion of the transitioning is shorter than the time required from the start of the transitioning from the stop state to the perception state in Step S106 to the completion of the transitioning.

The operation control unit 123 determines whether the key cylinder 30 is controlled to be set in the off-state in the specified time required for the transitioning from the standby state to the perception state, based on the instruction information obtained by the obtaining unit 121 (Step S124). When the operation control unit 123 determines that the key cylinder 30 is controlled to be set in the off-state within the specified time required for the transitioning from the standby state to the perception state, the operation control unit 123 proceeds to Step S114, and keeps the state of the perception device 100 in the standby state. On the other hand, when the operation control unit 123 determines that the key cylinder 30 is not controlled to be set in the off-state within the specified time required for the transitioning from the standby state to the perception state, the operation control unit 123 proceeds to Step S110, and causes the state of the perception device 100 to transition to the standby state.

[Effects According to Perception Device 100 of Present Embodiment]

The following will describe effects of the present embodiment described above.

(1) When the instruction information obtained while the state of the perception device 100 is in the perception state indicates an instruction for stopping the operation of the industrial vehicle, the operation control unit 123 does not cause the state of the perception device 100 to transition to the stop state but causes the state of the perception device 100 to transition to the standby state.

Here, the passenger of the industrial vehicle may frequently stop the operation of the industrial vehicle at the time of loading or unloading loads on or from the industrial vehicle, or the like. With this configuration, when the industrial vehicle is started up after the passenger of the industrial vehicle temporarily stops the industrial vehicle, a startup time of the perception device 100 is shortened due to the operation control unit 123.

(2) The obtaining unit 121 obtains the information indicating the on-state or the off-state of the switch 31 provided in the key cylinder 30 as the instruction information.

With this configuration, due to the perception device 100, the passenger of the industrial vehicle can easily instruct the industrial vehicle on the operation by a simple measure such as the key cylinder 30.

(3) After the operation control unit 123 causes the state of the perception device 100 to transition to the standby state, when the specified condition is satisfied, the operation control unit 123 causes the state of the perception device 100 to transition to the stop state.

With this configuration, when the specified condition is satisfied, the operation control unit 123 causes the state of the perception device 100 to transition to the stop state, so that it is possible to suppress energy consumption of the industrial vehicle associated with a continuation of the standby state.

(4) The specified condition includes the condition that the specified time has passed since the transitioning to the standby state. After the operation control unit 123 causes the state of the perception device 100 to transition to the standby state, when the specified time passes, the operation control unit 123 causes the state of the perception device 100 to transition to the stop state.

With this configuration, when the specified time has passed since the transitioning to the standby state, the operation control unit 123 causes the state of the perception device 100 to transition to the stop state, so that it is possible to suppress energy consumption of the industrial vehicle associated with the continuation of the standby state.

(5) The obtaining unit 121 further obtains detection information indicating the detection results of the detection units 40. The specified condition includes the condition that the detection results show that there is no person around the industrial vehicle. After the operation control unit 123 causes the state of the perception device 100 to transition to the standby state, when the detection results show that there is no person around the industrial vehicle, the operation control unit 123 causes the state of the perception device 100 to transition to the stop state.

With this configuration, when there is no person around the industrial vehicle, the passenger is regarded as one who does not use the industrial vehicle, so that the operation control unit 123 causes the state of the perception device 100 to transition to the stop state. As a result, it is possible that the operation control unit 123 suppresses the energy consumption of the industrial vehicle associated with the continuation of the standby state.

(6) After the operation control unit 123 causes the state of the perception device 100 to transition to the standby state, when the specified condition is not satisfied, the operation control unit 123 keeps the state of the perception device 100 in the current state.

With this configuration, when the passenger of the industrial vehicle starts up the industrial vehicle after temporarily stopping the industrial vehicle, the startup time of the perception device 100 is shortened due to the operation control unit 123.

(7) In a case where the instruction information indicates the instruction for stopping the operation of the industrial vehicle when the operation control unit 123 causes the state of the perception device 100 to transition from the standby state to the perception state, the operation control unit 123 causes the state of the perception device 100 to transition from the perception state to the standby state.

With this configuration, after the state of the perception device 100 is transitioned from the standby state to the perception state, in a case where the operation of the industrial vehicle is stopped again while the perception device 100 starts up in the shortened startup time, the operation control unit 123 causes the state of the perception device 100 to transition to the standby state. With this configuration, it is possible that the operation control unit 123 suppresses energy consumption of the industrial vehicle associated with the continuation of the perception state. The case where the operation of the industrial vehicle is stopped again while the perception device 100 starts up in the shortened startup time corresponds to a case where the passenger of the industrial vehicle operates the key cylinder 30 by mistake, for example.

[Case where Transition to Standby State does not Occur]

In the above description, the operation control unit 123 causes the state of the perception device 100 to transition to the standby state in Step S114, but the present disclosure is not limited to this aspect. For example, when the operation control unit 123 determines that the key cylinder 30 is in the off-state while the perception device 100 is in the perception state, the operation control unit 123 may keep the state of the perception device 100 in the perception state. As a result, when the passenger of the industrial vehicle starts up the industrial vehicle after temporarily stopping the industrial vehicle, it is possible that the operation control unit 123 immediately operates the industrial vehicle without starting up the perception device 100 again. In this case, instead of the process in which the operation control unit 123 causes the state of the perception device 100 to transition to the standby state, the operation control unit 123 keeps the state of the perception device 100 in the perception state in Step S114. Here, the process of the start of the transitioning from the standby state to the perception state in Step S122 is omitted.

The above-described embodiments may be modified as follows. The above-described embodiments and the following modifications may be combined with each other as long as there is no technical contradiction with each other.

The configuration of the vehicle system illustrated in FIG. 1 is merely one example, and a part of the elements may be omitted or another element may be added to the vehicle system.

The detection units 40 may have elements other than the above-described elements. The detection units 40 may include, for example, an acceleration sensor, a velocity sensor, and the like that do not require the sensor fusion process by the perception device 100. In this case, the controller 200 may obtain the detection result of the acceleration sensor or the velocity sensor not via the perception device 100. In addition, the detection units 40 may include a part of the above-described elements.

The obtaining unit 121 may obtain the instruction information from a device other than the key cylinder 30. For example, the obtaining unit 121 may obtain the seating information as the instruction information. The passenger of the industrial vehicle gets out of the industrial vehicle and leaves the seat, which corresponds to instructing the industrial vehicle to stop the operation. The passenger of the industrial vehicle gets in the industrial vehicle and sits on the seat, which corresponds to instructing the industrial vehicle to start the operation. The obtaining unit 121 may also obtain information indicating whether or not the parking brake is operated, as the instruction information. The passenger of the industrial vehicle sets the parking brake in an operation state, which corresponds to instructing the industrial vehicle to stop the operation. The passenger of the industrial vehicle sets the parking brake in a non-operation state, which corresponds to instruct the industrial vehicle to start the operation.

The perception result of the perception device 100 may be used for causing the industrial vehicle to travel autonomously in addition to the notification to the passenger of the industrial vehicle. In this case, the controller 200 generates a target track along which the industrial vehicle will travel autonomously. The autonomously travelling includes travelling without a driver's operation. The target track includes, for example, a velocity element. The target track may be expressed as arrangement of track points to be reached by the industrial vehicle in order. The track points are points to be reached by the industrial vehicle, and arranged along the generated track at each specified traveling distance. In addition to the track points, a target velocity and a target acceleration are generated as a part of the target track at each specified sampling time. The specified traveling distance corresponds to a distance of about a few meters [m], for example. The specified sampling time corresponds to a time of about zero point a few seconds [sec], for example. The track points may be positions to be reached by the industrial vehicle at the sampling time at each specified sampling time. In this case, the information of the target velocity and the target acceleration is expressed by intervals between the track points. The controller 200 controls the travel driving force output device 300, the braking device 310, and the steering device 320 so that the industrial vehicle passes along the generated target track on time.

The operation control unit 123 may determine that the predetermined condition is satisfied when both the first condition and the second condition are satisfied. The first condition and the second condition as the specified condition are just examples, and are not limited thereto.

In a case where the specified time in the first condition is not determined by the input to the HMI 50 by the passenger, the vehicle system need not include the HMI 50.

In a case in which the second condition is not used for the determination of the specified condition, the vehicle system need not include the seat sensor 60.

The operation control unit 123 may determine whether or not a passenger is in the industrial vehicle, based on other information instead of or in addition to the seating information obtained from the seat sensor 60. The operation control unit 123 may determine whether or not a passenger is in the industrial vehicle, based on a detection result of a grip sensor provided on a steering wheel of the industrial vehicle, for example. Alternatively, the operation control unit 123 may determine whether or not a passenger is in the industrial vehicle, based on images generated by a vehicle interior camera, which is provided in the vehicle interior of the industrial vehicle and captures the vehicle interior.

A case where the operations of the internal combustion engine and the electric motor of the industrial vehicle are stopped when the key cylinder 30 is set in the off-state is described in the present embodiment. However, the present disclosure is not limited to this aspect. Even when the key cylinder 30 is set in the off-state, the internal combustion engine and the electric motor of the industrial vehicle may continue operating in the perception state or in the standby state. The internal combustion engine of the industrial vehicle may be controlled to be set in an idling state in the standby state.

REFERENCE SIGNS LIST

1 vehicle system
10 battery
20 switch
30 key cylinder
40 detection unit
41 camera
42 radar
43 finder
50 HMI
60 seat sensor
70 driving operator
100 perception device
120 control unit
121 obtaining unit
122 perception unit
123 operation control unit
130 memory
200 controller
300 travel driving force output device
310 braking device
320 steering device

The invention claimed is:

1. A perception device comprising:
at least one memory configured to store program code;
at least one processor configured to operate as instructed by the program code, the program code including:
perception code configured to cause at least one of the at least one processor to perceive surroundings of a moving body based on a detection result of a detection unit;
obtaining code configured to cause at least one of the at least one processor to obtain supply information indicating a supply state of an electric power from a power supply mounted on the moving body to the moving body and instruction information indicating an instruction for an operation to the moving body; and
operation control code configured to cause at least one of the at least one processor to control a state of the perception device based on the supply information and the instruction information, wherein
the perception device is in a perception state in which the perception device perceives the surroundings, in a stop state in which the perception device stops a process of perceiving the surroundings, or in a standby state in which the perception device stands by until the state of the perception device is transitioned to the perception state, and
when the instruction information obtained in the perception state indicates the instruction for stopping the operation of the moving body, the operation control code is further configured to cause at least one of the at least one processor to determine whether to keep the state of the perception device in the perception state or to cause the state of the perception device to transition to the standby state, without first attempting to transition to the stop state,
wherein the perception device is configured to shorten a startup time when the moving body is started up after the passenger of the moving body temporarily stops the moving body for suppressing energy consumption.

2. The perception device according to claim 1, wherein the obtaining code is further configured to cause at least one of the at least one processor to obtain information indicating an on-state or an off-state of a switch provided in a key cylinder of the moving body as the instruction information.

3. The perception device according to claim 1, wherein after the operation control code is configured to cause at least one of the at least one processor to keep the state of the perception device in the perception state or cause the state of the perception device to transition to the standby state, when a specified condition is satisfied, the operation control code is further configured to cause at least one of the at least one processor to cause the state of the perception device to transition to the stop state.

4. The perception device according to claim 3, wherein the specified condition includes a condition that a specified time has passed since the transitioning to the standby state.

5. The perception device according to claim 3, wherein the obtaining code is further configured to cause at least one of the at least one processor to obtain detection information indicating the detection result of the detection unit,
the specified condition includes a condition that the detection result shows that there is no person around the moving body,
after the operation control code is configured to cause at least one of the at least one processor to cause the state of the perception device to transition to the standby state, the perception code is further configured to cause at least one of the at least one processor to perceive the surroundings based on the detection result of the detection unit, and
when the perception result shows that there is no person around the moving body, the operation control code is further configured to cause at least one of the at least one processor to cause the state of the perception device to transition to the stop state.

6. The perception device according to claim 1, wherein in a case where the instruction information indicates the instruction for stopping the operation of the moving body when the operation control code is configured to cause at least one of the at least one processor to cause the state of the perception device to transition from the standby state to the perception state, the operation control code is further configured to cause at least one of the at least one processor to cause the state of the perception device to transition from the perception state to the standby state.

\* \* \* \* \*